United States Patent
Zhang et al.

(10) Patent No.: US 6,601,070 B2
(45) Date of Patent: Jul. 29, 2003

(54) DISTRIBUTION OF PHYSICAL FILE SYSTEMS

(75) Inventors: Zheng Zhang, San Jose, CA (US); Mallik Mahalingam, Santa Clara, CA (US); Christos Karamanolis, Sunnyvale, CA (US); Daniel Alan Muntz, Cupertinino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 342 days.

(21) Appl. No.: 09/826,569

(22) Filed: Apr. 5, 2001

(65) Prior Publication Data

US 2002/0147719 A1 Oct. 10, 2002

(51) Int. Cl.[7] ............................................... G06F 17/30
(52) U.S. Cl. ........................ 707/8; 707/10; 707/104.1; 707/201
(58) Field of Search ................................ 707/1, 3, 6, 8, 707/9, 10, 100, 104.1, 201; 703/23; 709/230, 238

(56) References Cited

U.S. PATENT DOCUMENTS

| 5,490,270 | A | * | 2/1996 | Devarakonda et al. ...... 707/201 |
| 5,640,537 | A | * | 6/1997 | Jessen et al. .................. 703/23 |
| 6,247,060 | B1 | * | 6/2001 | Boucher et al. ............. 709/238 |
| 6,438,545 | B1 | * | 8/2002 | Beauregard et al. ........... 707/6 |

* cited by examiner

Primary Examiner—Shahid Al Alam

(57) ABSTRACT

Data coherency and lock services for distributed physical file systems. Client applications are coupled to a virtual file system, which is coupled to one or more physical file systems. A lock agent is coupled to one or more lock servers and to the virtual file system. The virtual file system, in response to a file access request from a client application, submits a data validation request to the lock agent. The lock agent, in turn, submits a lease request to the lock server. When the lock server grants the lease, the lease and a validation code are returned to the lock agent. The validation code indicates whether the data in the buffer cache of the virtual file system are valid. The lock agent then returns the lease to the virtual file system, which then submits the file access request to a selected one of the physical file systems.

28 Claims, 3 Drawing Sheets

DISTRIBUTION OF PHYSICAL FILE SYSTEMS

FIELD OF THE INVENTION

The present invention generally relates to distributed file systems, and more particularly to distribution of physical file systems using a shared data coherency and lock control service.

BACKGROUND

Conceptually, a physical file system architecture includes system meta-data, $M_{sys}$, object meta-data, $M_{object}$, and object data. The $M_{sys}$ data describes the entire file system. For example, $M_{sys}$ includes system parameters, an i-node bitmap, a block bitmap and other file system-dependent information.

The $M_{object}$ data describes a file or directory. In an example physical file systems, a particular $M_{object}$ segment includes the file i-node and direct and indirect blocks. The i-node includes information such as the name of the file, access rights, update times, pointers to data blocks, and pointers to indirect, double indirect, and triple indirect blocks. The indirect blocks also contain pointers to data blocks. The file data is the data referenced and manipulated by one or more client application programs.

A distributed physical file system is generally characterized by multiple storage servers that store and serve data to client applications. The storage servers and systems that host the client applications are connected to a network. The physical file system (PFS) generally provides a locking mechanism to enforce exclusive access to some of the storage space. Specifically, the PFS coordinates locking the $M_{sys}$ and $M_{object}$ data. For example, when a client is writing to a file, the i-node is locked to prevent another client from manipulating the same file. Any operations that result in allocating or de-allocating i-node or data blocks cause the associated bitmap areas to be locked.

In order to provide acceptable performance, distributed PFSs also support local caching of file data at the systems that host the client applications. However, in order to support caching, the distributed PFS includes coherence control logic to ensure that the client applications share a consistent view of the file data.

Many distributed PFSs are proprietary, making it difficult to spread data in present file systems to distributed file systems. In addition, present distributed PFSs, for example, Frangipani, GFS, and FPFS offer a distributed lock manager and service at the kernel, which may not scale well beyond a certain number of storage servers.

A system and method that address the aforementioned problems, as well as other related problems, are therefore desirable.

SUMMARY OF THE INVENTION

In various embodiments, the invention provides client applications with access to file data in a distributed file system. Each of the client applications is coupled to a virtual file system that that provides an interface to one or more physical file systems. The virtual file system interfaces with a lock agent that runs locally with the virtual file system. The virtual file system is invoked when client applications request file access, and validation requests are submitted to the lock agent by the virtual file system in response to the file access requests. The lock agent in turn sends lock requests to the lock server. The lock server manages locks and data coherency for the physical file systems. When the lock server grants a lease, the lease and a validation code are returned to the lock agent. The "lease" is a lock that is granted for a specified period of time, and the validation code indicates whether the data in the buffer cache of the virtual file system are valid. The lock agent then returns the lease to the virtual file system, which then submits the file access request to a selected one of the physical file systems. Having the data coherency and lock service at the level of the virtual file system allows distribution of virtually any physical file system in an efficient and straightforward manner.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments of the invention, conventional and/or standards-based lock service components are used in conjunction with a virtual file system. The virtual 10 file system provides a plurality of client applications with access to data in a distributed file system. The data in the distributed file system is managed by one or more physical file systems. The data concurrency and coherency is managed by one or more lock servers, and the virtual file system interfaces with the lock server(s) via a lock agent. The present invention uses locking protocols at the virtual file system level. Implementing the locking at the virtual file system level and above the physical file system level allows the same lock components to be used in a system where there are multiple, different physical file systems below the physical file system.

Figure 1:
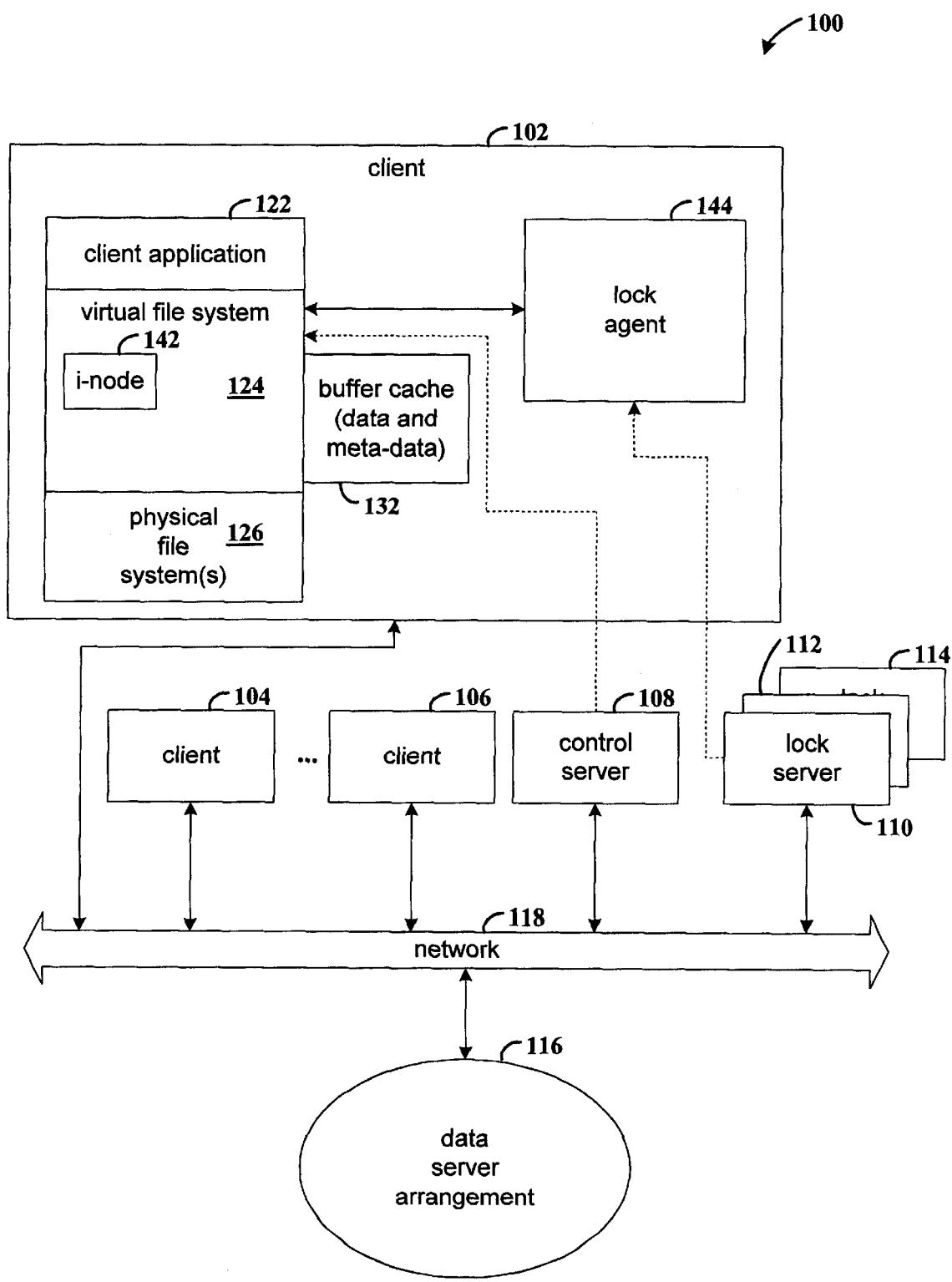
FIG. 1 is a functional block diagram of a computing arrangement in which data in a physical file system is distributed, and at the virtual file system level a lock service is used for locking and coherency functions.

FIG. 1 is a functional block diagram of a computing arrangement 100 in which data in a physical file system is distributed, and at the virtual file system level a lock service is used for concurrency and coherency functions. Computing arrangement 100 includes multiple client systems 102, 104, 106, a file system control server 108, multiple lock servers 110, 112, 114, and a data server arrangement 116. The various systems and components are inter-coupled via a conventional network 118. The particular hardware and software computing arrangements on which the client and server systems are deployed are implementation dependent, and the present invention is suitable for a variety of hardware and software architectures.

Each of the client systems 102, 104, 106 hosts one or more client applications. For example, client system 102 hosts client application 122. The client applications read and/or write data that are stored in data server arrangement 116. Client application 122 invokes file access routines of virtual file system 124, which in turn invokes routines of the physical file system 126 for file access.

The virtual file system 124 is interposed between the client application 122 and the physical file system 126 to provide an abstract file interface to the client application. Thus, the client application includes generic file interface calls to the virtual file system instead of file interface calls to the specific routines of the physical file system. This allows the virtual file system to support any physical file system that adheres to the virtual file system interface. Thus, multiple physical file systems 126 can be implemented on a single client system and access for the client applications provided via a single interface. The virtual file system also provides common services, such as file data caching, for different physical file systems. An example virtual file system is that provided with the Linux operating system.

In accordance with one embodiment of the present invention, implementation of the lock and coherency protocol is left to the virtual file system. The physical file system manages the file meta-data ($M_{object}$) and the file data (from the user's perspective) and is adapted to allow the virtual file system to manage selected system meta-data ($M_{sys}$) via the control server. Example physical file systems include the ReiserFS and EXT2 systems.

In one embodiment, data server arrangement 116 is implemented with a storage area network (SAN). A SAN can be implemented with an Internet Protocol (IP) arrangement such as iSCSI, or with a fiber channel arrangement. Software such as McData's SAN Management and IBM's Tivoli is required to manage and configure a SAN.

Cache storage of object data and meta-data is provided and managed by buffer cache 132. For example, the Linux operating system includes a buffer cache.

Virtual file system 124 reads an i-node 142 of a file into its program memory when processing a file access request directed to the file. Before the i-node is used, the virtual file system calls the lock agent 144 to validate the i-node as between other client systems 104, 106 and validate the range of data referenced in the file access request. The validation request is implemented as a conventional lease request that is sent from the lock agent to the lock server.

The present invention includes a lock agent 144 and one or more lock servers 110, 112, 114, which provide object locking and coherency services to the virtual file system. Using standards-based lock logic, for example, NFS locking, eliminates re-inventing a locking mechanism. Interfacing the lock logic with the virtual file system 124 does not require the lock logic to be compatible with the physical file system(s) 126.

The lock agent 144 maps the i-node in a validation request to a lock object. Since the lock server 110 needs unique identifiers for the objects to which locks are applied, the lock agent needs to provide the identifier for an i-node for which a lock is needed. The lock agent uses information in the i-node to uniquely identify the lock object. If the lock agent 144 has a valid lease on the lock object, control is returned to the virtual file system. Otherwise, an NFS read lease or write lease request is generated and sent to one of the lock servers 110, 112, 114. The lock server is selected based on the i-node number. Each i-node has a number that is assigned by the physical file system 126 when the i-node is created. In one embodiment, the lock service for the i-nodes are distributed evenly among the lock servers, and a modulo function is used to determine the appropriate lock server.

The terms "lock" and "lease" are both used in this application. An object is said to be locked if a client has a lease on the object. A lease is defined by an object being exclusively held by a client for a certain duration.

The lock server provides a response to the lock agent that indicates whether a lease was granted. In addition, the lock server indicates whether the data in buffer cache 132 is invalid. When the lock server grants a write lease for selected blocks, leases granted for the selected blocks subsequent to expiration of the write lease will indicate to the requesters that the data are invalid. In one embodiment, the lock servers are implemented using conventional, standards-based software such as that available in NFS. It will be appreciated that in other embodiments the lock servers can be implemented using other conventional software such as that conforming to the CIFS protocol from Microsoft.

Control server 108 processes non-idempotent operations (some operations on $M_{sys}$ data) for the physical file system(s) 126. "Idempotent" operations are those for which the side-effects of N>0 identical requests are the same as for a single request, aside from error or expiration issues. Non-idempotent operations include, for example, delete, rename, truncate, etc. Since the $M_{sys}$ data is modified on only one system, concurrency control of the $M_{sys}$ data is simplified with implementation on a single system. Furthermore, the details of the underlying physical file system do not need to be addressed in constructing the control server.

Figures 2, 4:
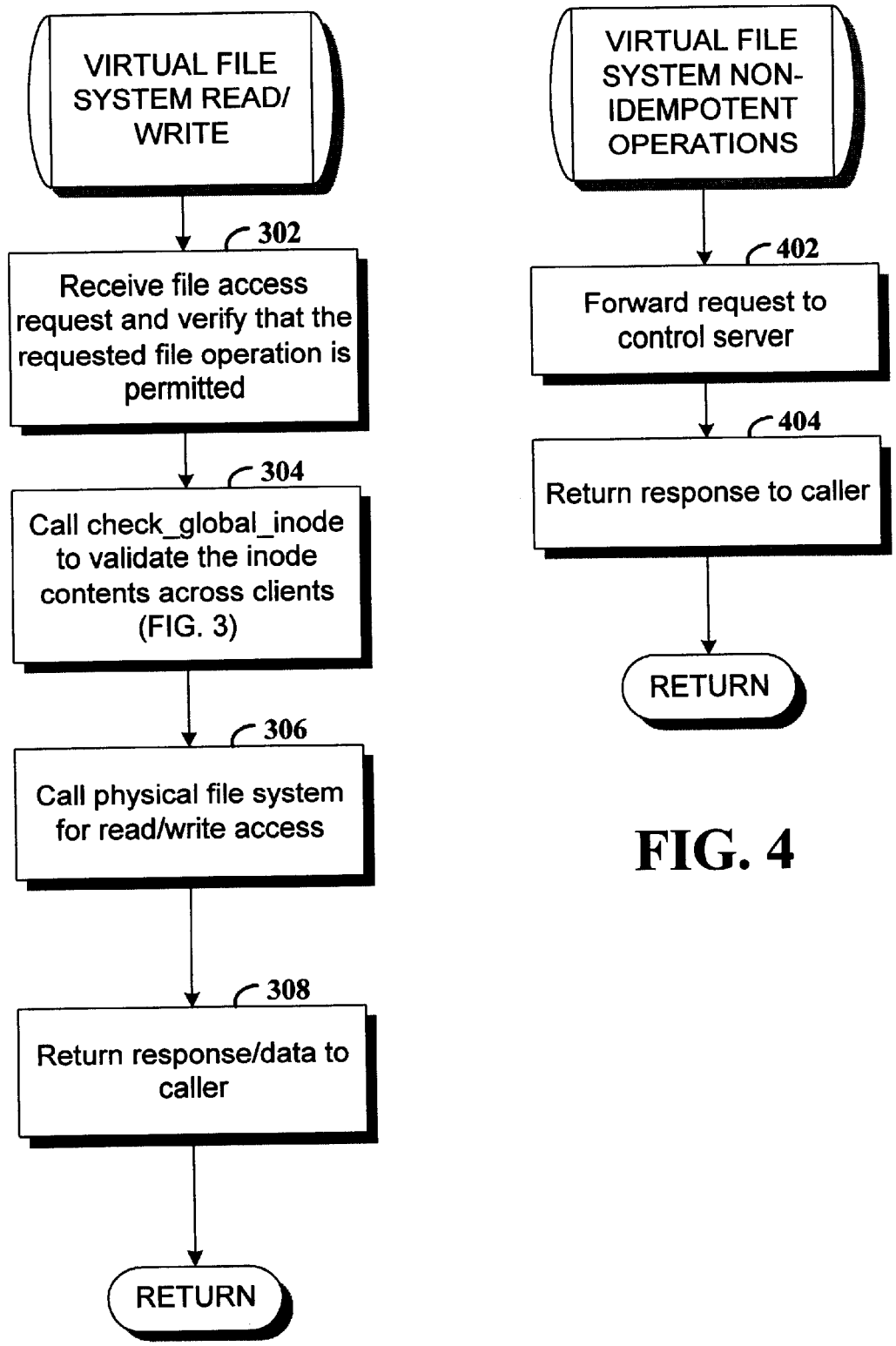
FIG. 2 is a flowchart of a process implemented by the virtual file system for processing read and write requests.
FIG. 4 is a flowchart of a process performed by the virtual file system in processing non-idempotent file operations.

FIG. 2 is a flowchart of a process implemented by the virtual file system for processing read and write requests. At step 302, the process verifies that the requested operation is permitted. For example, the process checks whether the client application has permission to perform the specified operation according to file permission tags. If the operation is permitted, the process continues at step 304, where the CHECK_GLOBAL_INODE routine is called. The CHECK_GLOBAL_INODE routine validates the i-node 142 across other client systems having access to the file and validates the requested file data. The virtual file system obtains the i-node for the referenced file from the physical file system when a file is opened.

Upon return from the CHECK_GLOBAL_INODE routine, at step 306 the virtual file system calls the physical file system with the read/write operation specified by the client application. At step 308, the response or data are returned to the calling client application to complete the process.

Figure 3:
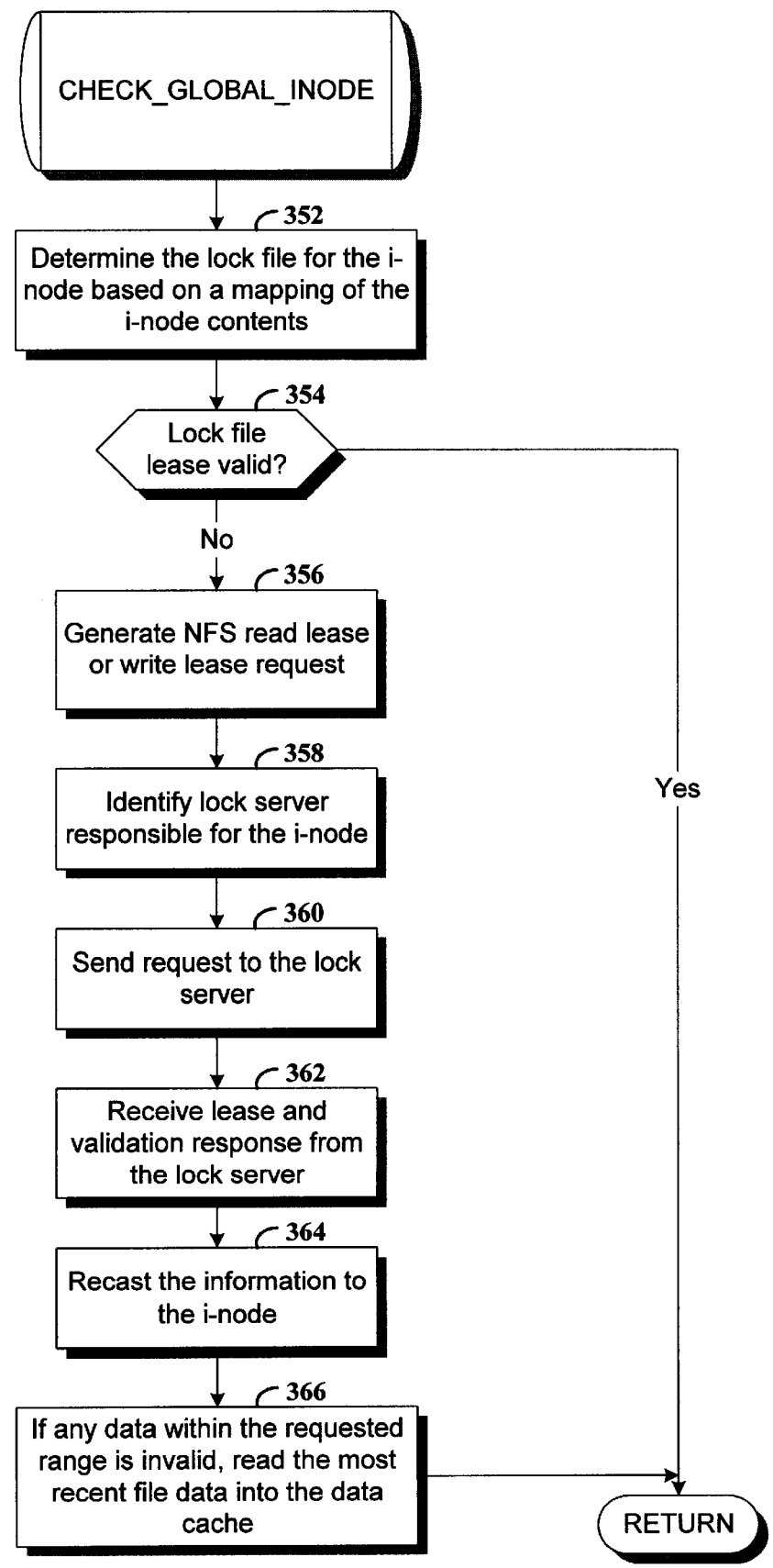
FIG. 3 is a flowchart of a process performed by the CHECK_GLOBAL_INODE routine in processing read/write requests from the virtual file system.

FIG. 3 is a flowchart of a process performed by the CHECK_GLOBAL_INODE routine in processing read/write requests from the virtual file system. At step 352, the process determines the lock object that is associated with the i-node using information in the i-node. Decision step 354 tests whether the client system has a valid lease for the lock object. The validity of a lease is determined by the duration of the lease, the time at which the lease was granted, and the current time. The lock agent 144 tracks this information for the objects for which lock services are provided. If the lease is valid, control is returned to the virtual file system. Otherwise, the process is directed to step 356.

At step 356, a read lease or write lease request is generated. At step 358, the process determines which lock server is responsible for the i-node using the i-node number. The request is then transmitted to the selected lock server at step 360. The lock server determines whether a lease request is in conflict with the current status of the referenced blocks. For example, multiple clients can concurrently hold read leases. However, if a write lease is valid, the lock server will not grant another lease until the write lease expires. When a write lease expires and a lease is subsequently granted to a client, the lock server indicates that the data in the client's cache are invalid. When the lock server receives a write lease request and there are valid read leases to other clients or a valid write lease to another client, the write lease is granted after all the valid leases expire.

At step 362, the CHECK_GLOBAL_INODE routine receives a response from the lock server indicating whether the lock was granted. At step 364, selected information in the response from the lock server is recast to an i-node structure, which is returned to the virtual file system.

The response from the lock server indicates whether the requested range of data is invalid. If so, the lock agent invokes the physical file system at step 366 to read the most recent file data into the buffer cache 132. The process then returns control to the virtual file system.

FIG. 4 is a flowchart of a process performed by the virtual file system in processing non-idempotent file operations. As described above, the non-idempotent file operations include, for example, delete, rename, truncate, etc. When a non-idempotent file operation is detected in a file access request, the request is forwarded to the control server as shown by step 402. The control server interacts with the physical file system as necessary to perform the file operation. When a response is received from the control server, the response is returned to the client application at step 404.

Embodiments of the present invention, beyond those described herein, will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for providing client applications with access to file data in a distributed file system, the method comprising:
    invoking a virtual file system with file access requests from the client applications, each file access request including an operation code and a data reference;
    submitting data validation requests to a lock agent by the virtual file system in response to the file access requests, the lock agent coupled to the virtual file system;
    submitting lease requests from the lock agent to a lock server coupled to the lock agent;
    processing lease requests by the lock server;
    returning leases from the lock server to the virtual file system via the lock agent in response the lease requests; and
    for each file access request, submitting the file access request to a selected one of one or more physical file systems after a lease is granted, the one or more physical file systems coupled to the virtual file system.

2. The method of claim 1, wherein a plurality of lock servers are coupled to the lock agent, further comprising, for each validation request submitted to the lock agent, selecting one of the lock servers and submitting the lock request to the one of the lock servers.

3. The method of claim 2, wherein the distributed file system further includes a control server coupled to the virtual file system, further comprising:
    transmitting from the virtual file system to the control server non-idempotent, file access operations that request access to system meta-data; and
    processing the non-idempotent, file access operations at the control server.

4. The method of claim 3, wherein a buffer cache is coupled to the virtual file system for caching data from the one or more physical file systems, and further comprising:
    returning validation codes along with the leases from the lock server to the lock agent in response to the lease requests, a validation code indicating whether data held in the buffer cache is valid.

5. The method of claim 4, further comprising processing lease requests between the lock agent and the one or more lock servers consistent with the NFS protocol.

6. The method of claim 1, wherein the distributed file system further includes a control server coupled to the virtual file system, further comprising:
    transmitting from the virtual file system to the control server non-idempotent, file access operations that request access to system meta-data; and
    processing the non-idempotent, file access operations at the control server.

7. The method of claim 6, wherein a buffer cache is coupled to the virtual file system for caching data from the one or more physical file systems, and further comprising:
    returning validation codes along with the leases from the lock server to the lock agent in response to the lease requests, a validation code indicating whether data held in the buffer cache is valid.

8. The method of claim 7, further comprising processing lease requests between the lock agent and the one or more lock servers consistent with the NFS protocol.

9. The method of claim 1, wherein a buffer cache is coupled to the virtual file system for caching data from the one or more physical file systems, and further comprising:
    returning validation codes along with the leases from the lock server to the lock agent in response to the lease requests, a validation code indicating whether data held in the buffer cache is valid.

10. The method of claim 9, further comprising processing lease requests between the lock agent and the one or more lock servers consistent with the NFS protocol.

11. The method of claim 1, further comprising processing lease requests between the lock agent and the one or more lock servers consistent with the NFS protocol.

12. A distributed file system, comprising:
    a client data processing system;
    a storage area network coupled to the client system;
    a physical file management system coupled to the storage area network and executable on the client system;
    a lock agent executable on the client system, the lock agent configured to provide data locking and data coherence services;
    a plurality of lock servers coupled the lock agent, each lock server configured to manage locks and data coherency for a selected portion of storage in the storage area network; and
    a virtual file management system coupled to the physical the management system and executable on the client system, the virtual file management system configured to interface with the physical file management system and initiate the lock agent prior to interfacing with the physical file management system in response to a client-initiated function call that references a storage area of the storage area network.

13. The system of claim 12, further comprising a plurality of physical file management systems coupled to the virtual file system.

14. The system of claim 13, further comprising a buffer cache coupled to the virtual file system for storage of data from the plurality of physical file systems.

15. The system of claim 14, wherein each of the lock servers is further configured to return a validation code to the lock agent in response to a lease request, the validation code indicating whether data referenced in the file access request is invalid if present in the buffer cache.

16. The system of claim 15, further comprising:

a control server coupled to the communications network, the control server configured and arranged to manipulate distributed file system meta-data in response to input operation requests; and wherein the virtual file management system is further configured to transmit system non-idempotent meta-data operation requests to the control server.

17. The system of claim 12, further comprising a buffer cache coupled to the virtual file system for storage of data from the physical file system.

18. The system of claim 17, wherein each of the lock servers is further configured to return a validation code to the lock agent in response to a lease request, the validation code indicating whether data referenced in the file access request is invalid if present in the buffer cache.

19. The system of claim 12, further comprising:

a control server coupled to the communications network, the control server configured and arranged to manipulate distributed file system meta-data in response to input operation requests; and wherein the virtual file management system is further configured to transmit system non-idempotent meta-data operation requests to the control server.

20. An apparatus for providing client applications with access to the data in a distributed file system, comprising:

means for invoking a virtual file system with file access requests from the client applications, each file access request including an operation code and a data reference;

means for submitting data validation requests to a lock agent by the virtual file system in response to the file access requests, the lock agent coupled to the virtual file system;

means for submitting lease requests from the lock agent to a lock server coupled to the lock agent;

means for processing lease requests by the lock server;

means for returning leases from the lock server to the virtual file system via the lock agent in response the lease requests; and means for, for each file access request, submitting the file access request to a selected one of one or more physical file systems after a lease is granted, the one or more physical file systems coupled to the virtual file system.

21. The apparatus of claim 20, further comprising a plurality of lock servers are coupled to the lock agent; and means for, for each validation request submitted to the lock agent, selecting one of the lock servers and submitting the lock request to the one of the lock servers.

22. The apparatus of claim 21, further comprising:

a control server coupled to the virtual file system;

means for transmitting from the virtual file system to the control server non-idempotent, file access operations that request access to system meta-data; and means for processing the non-idempotent, file access operations at the control server.

23. The method of claim 22, further comprising:

a buffer cache is coupled to the virtual file system for caching data from the one or more physical file systems; and means for returning validation codes along with the leases from the lock server to the lock agent in response to the lease requests, a validation code indicating whether data held in the buffer cache is valid.

24. An article of manufacture, comprising:

a computer-readable medium configured with computer-executable instructions for providing client applications with access to file data in a distributed file system by performing the steps of, invoking a virtual file system with file access requests from the client applications, each file access request including an operation code and a data reference;

submitting data validation requests to a lock agent by the virtual file system in response to the file access requests, the lock agent coupled to the virtual file system;

submitting lease requests from the lock agent to a lock server coupled to the lock agent;

processing lease requests by the lock server;

returning leases from the lock server to the virtual file system via the lock agent in response the lease requests; and for each file access request, submitting the file access request to a selected one of one or more physical file systems after a lease is granted, the one or more physical file systems coupled to the virtual file system.

25. The article of manufacture of claim 24, wherein the computer-readable medium is further configured with instructions for causing a computer to perform the step of, for each validation request submitted to the lock agent, selecting one of a plurality of lock servers coupled to the lock agent and submitting the lock request to the one of the lock servers.

26. The article of manufacture of claim 25, wherein the computer-readable medium is further configured with instructions for causing a computer to perform the steps of:

transmitting from the virtual file system to a control server non-idempotent, file access operations that request access to system meta-data, wherein the control server is coupled to the virtual file system; and processing the non-idempotent, file access operations at the control server.

27. The article of manufacture of claim 26, wherein the computer-readable medium is further configured with instructions for causing a computer to perform the step of returning validation codes along with the leases from file lock server to the lock agent in response to the lease requests a validation code indicating whether data held in a buffer cache is valid, wherein the buffer cache is coupled to the virtual file system for caching data from the one or more physical file systems.

28. The article of manufacture of claim 26, wherein the computer-readable medium is further configured with instructions for causing a computer to perform the step of processing lease requests between the lock agent and the one or more lock servers consistent with the NFS protocol.

* * * * *